Figure 1:
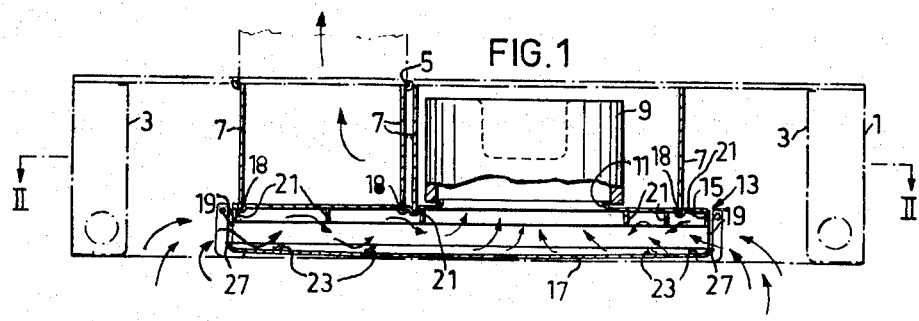

United States Patent [19]
Bergmark

[11] 3,768,237
[45] Oct. 30, 1973

[54] FILTER ARRANGEMENT IN KITCHEN VENTILATING SYSTEM

[76] Inventor: Nils Randolf Bergmark, Ringvagen 14, Byske, 930 47 Sweden

[22] Filed: Jan. 29, 1971

[21] Appl. No.: 111,011

[30] Foreign Application Priority Data
Jan. 30, 1970 Sweden .............................. 1217/70

[52] U.S. Cl. ..................... 55/439, 55/440, 55/444, 55/467, 55/DIG. 36, 55/115 K
[51] Int. Cl. ........................................... B01d 45/08
[58] Field of Search ....................... 55/440-446, 55/467, 437-439, DIG. 36; 98/115 K

[56] References Cited
UNITED STATES PATENTS

| | | | |
|---|---|---|---|
| 1,026,675 | 5/1912 | Hickey | 55/445 |
| 2,528,844 | 11/1950 | Robertson | 55/DIG. 36 |
| 2,971,452 | 2/1961 | Graswich et al. | 55/DIG. 36 |
| 3,289,398 | 12/1966 | McIlvaine | 55/440 |
| 3,364,664 | 1/1968 | Doane | 55/442 |
| R25,061 | 10/1961 | Raub et al. | 55/436 |
| 1,115,873 | 11/1914 | Spencer | 55/441 |
| 3,285,156 | 11/1966 | Bohanon | 55/440 |
| 3,433,146 | 3/1969 | Russell | 55/DIG. 36 |
| 3,566,585 | 3/1971 | Voloshen et al. | 55/435 |

FOREIGN PATENTS OR APPLICATIONS

| | | | |
|---|---|---|---|
| 354,917 | 7/1961 | Switzerland | 98/115 K |
| 1,297,543 | 5/1962 | France | 98/115 K |

*Primary Examiner*—Bernard Nozick
*Attorney*—Cushman, Darby & Cushman

[57] ABSTRACT

A kitchen ventilator having a ventilator hood in which is located a fan in a fan housing. The bottom of the fan housing is horizontal and removable and forms the upper portion of a slab-like grease separator unit. The bottom of the separator unit also forms the bottom of the ventilator hood. The grease separating means are formed by vertical posts, vanes or walls formed integrally with the separator unit upper portion and cooperating with the separator unit bottom to repeatedly alter the air flow direction either horizontally or vertically. The entire filter unit may be removed and folded open for cleaning, thereby also leaving the fan housing open for cleaning.

2 Claims, 5 Drawing Figures

FILTER ARRANGEMENT IN KITCHEN VENTILATING SYSTEM

The present invention relates to a kitchen ventilator or extractor of the type which comprises a ventilator hood, a fan located in a fan housing, and a removable grease capturing separator unit located in the air flow path on the suction side of the fan.

In known kitchen ventilators or extractors, the grease separator is normally in the form of metal wire filter cakes arranged in frames parallel to the bottom plane of the hood. One disadvantage with this arrangement is that the major portion of the air drawn in by the fan enters the proximity of the centre of the ventilator. This means losing the favourable shielding effect obtained when the air is drawn in through slots along the periphery of the hood.

Another disadvantage is that a number of components have to be dismounted when the ventilator is to be cleaned, thus making this work cumbersome.

An object of the present invention is to provide a separator arrangement for a kitchen ventilator of the aforementioned type which eliminates these disadvantages.

In accordance with a preferred aspect of the invention, this is achieved with a kitchen ventilator, which is characterized in that said separator unit comprises an upper portion formed by the removable bottom of the fan housing, a bottom parallel with said upper portion and located spaced below this, and air flow deflecting members connected with the underside of the fan housing bottom and extending downwards therefrom towards the separator unit bottom, said deflecting means cooperating with said separator unit bottom so as to repeatedly change the direction of air drawn in from a peripheral air inlet of the filter unit and flowing between said upper portion and said separator unit bottom towards said fan.

The air flow deflecting members are suitably formed integrally with said separator unit upper portion, conveniently from a plastics material. If the filter unit upper portion and bottom are pivotally connected together the removable separator unit may be folded open, thereby rendering all inner surfaces accessible for cleaning purposes. The upper portion and the bottom may be formed in one piece, a plastics hinge means then forming said pivotal connection.

In accordance with one aspect of the invention, the air intake openings are formed by the vertical spaces located between the upper portion and the bottom of the separator unit thereby obviating the necessity of making the openings in said members by special working operations. Alternatively, the air intake openings may be arranged turned downwardly, by providing the upper portion of the separator unit with a side wall and giving the bottom portion of the unit smaller dimensions than the upper portion so that a slot is left free between the edge surfaces of the two members. In a corresponding manner the air intake openings can be arranged turned upwardly, by making the upper portion of the separator unit slightly smaller than the bottom and providing the bottom with side walls. In this case, the bottom forms a bowl-like structure which captures the grease separated in the separator unit.

In accordance with another aspect of the invention, the bottom may also be constructed as a grease collecting bowl when the air intake openings are vertical.

Figure 2:
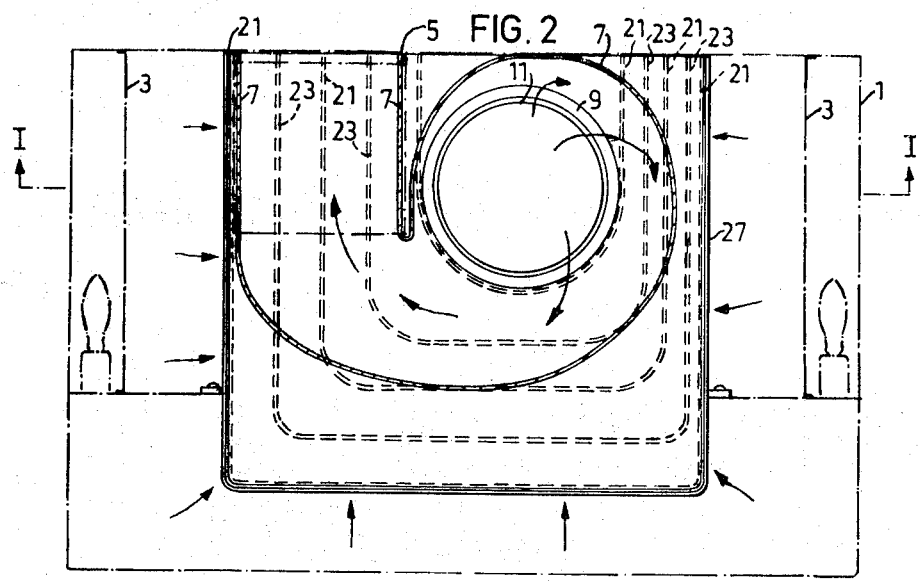
Figure 3:
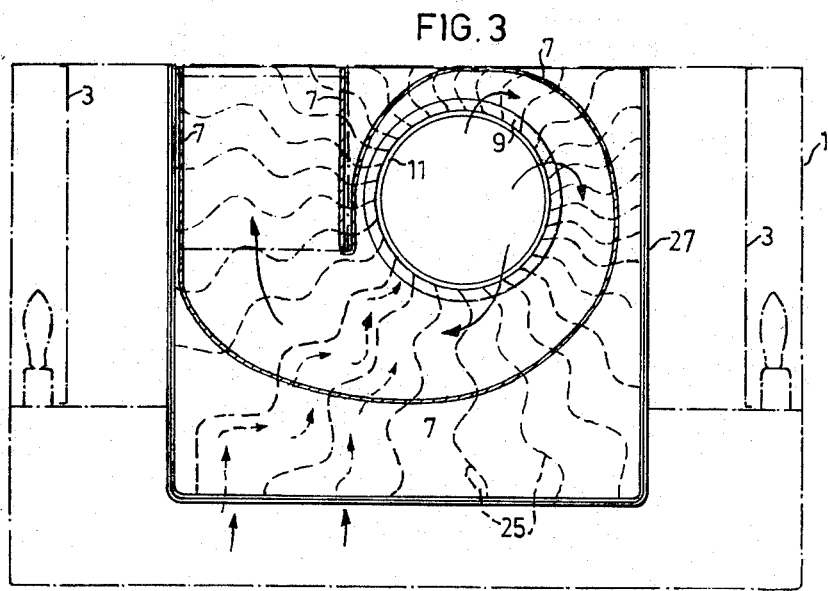
Figure 4:
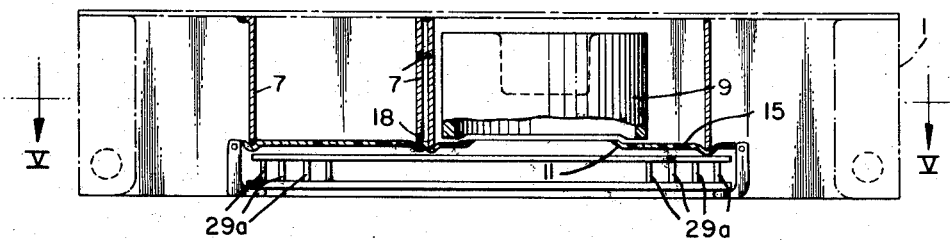
Figure 5:
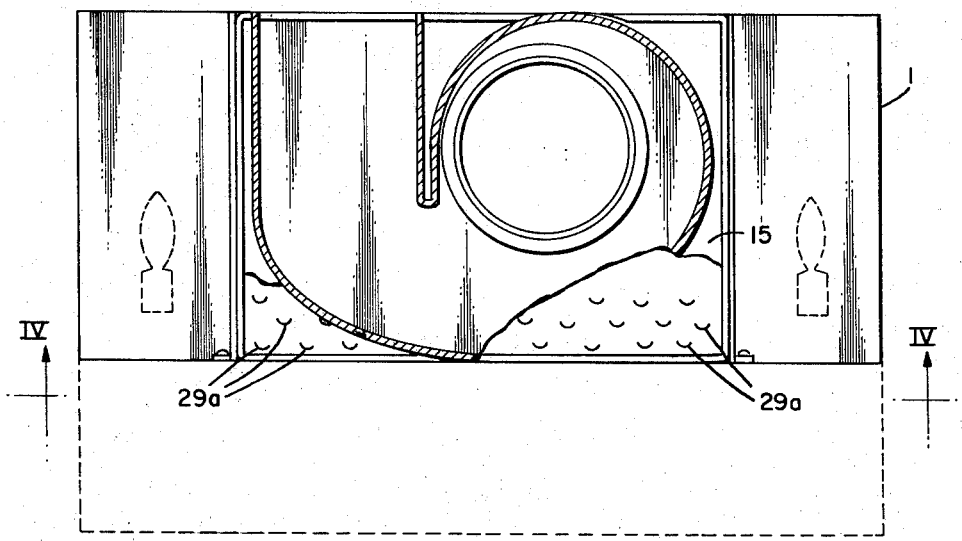

The invention will now be described in more detail with reference to the accompanying drawing, in which FIGS. 1 and 2 illustrate a first embodiment of a kitchen ventilator, seen in FIG. 1 in front view in vertical section along the line I—I in FIG. 2, and in FIG. 2 in plan view in section along the line II—II in FIG. 1. In a manner corresponding to FIG. 2, FIG. 3 illustrates a section through a second embodiment of a kitchen ventilator constructed in accordance with the invention. FIG. 4 is a front view of an alternate embodiment taken along lines IV—IV of FIG. 5 and FIGS. 5 is view taken along lines V—V OF FIG. 4.

Both of the illustrated embodiments have a ventilator hood 1, along each short side of which is mounted a lamp housing 3. The under side of the ventilator hood is completely open, its walls closed and its upper side is provided with an air outlet opening 5. The air outlet opening 5 opens from a volute-shaped fan housing 7 formed by a vertical wall attached to the upper side of the hood. A fan wheel 9 provided with a vertical shaft draws in air centrally through an opening 11 of the separator unit 13 arranged beneath the fan housing.

The separator unit 13 consists of an upper portion 15, preferably made from a plastics material, and a bottom 17, suitably made of sheet metal. The upper portion 15 and the bottom 17 are connected together by a hinge (not shown) located at the rear edge of the separator unit. The upper side of the upper portion 15 is provided with channels 18 intended to receive the lower edges of the walls of the fan housing 7. The separator unit 13 is held in place in the ventilator hood 1 by means of holding clips or the like located between the fan housing 7 or the hood 1 and the bottom 17 at the front portion of the fan housing and by virtue of the fact that the separator unit rests on a support surface at the rear edge of the hood. In this way, the upper portion 15 of the separator unit forms the bottom of the fan housing 7 with its air outlet passage to the outlet opening 5.

The air is sucked in to the separator unit 13 through the slot-like air intake openings 19, which are formed at the periphery of the separator unit by reason of the fact that there are no vertical walls either at the front or at the sides of said periphery. Between these air intake openings 19 and the air outlet opening 11 on the separator unit are arranged air deflecting members, which remove from the air particles of grease suspended therein.

In the embodiment illustrated in FIGS. 1 and 2, the air deflecting members consist of walls 21, projecting from the upper portion 15, and strips 23 projecting upwardly from the bottom 17, the walls and strips being arranged alternatingly in the flow path of the air. The walls 21 and the strips 23 form elongated arcuate structures which begin and terminate at the rear side of the separator unit, the shape of the arcuate structures conforming to the periphery of the separator unit. The air flow is deflected by the walls 21 and the strips 23 in a vertical zig-zag path, as shown by the arrows in FIG. 1. The air flow is not deflected horizontally to any appreciable extent however, but is directed radially towards the opening 11. Also located between the upper portion 15 and the bottom 17 are distance pieces (not shown), arranged to maintain the desired distance between the two members.

Alternatively all the projections or walls may be mounted on either the upper portion or the bottom, certain walls being mounted with distance pieces to permit air to flow under the walls.

In the embodiment illustrated in FIG. 3, the air deflecting members are in the form of vertical walls 25 which are made integral with the upper portion 15 and extend down to the bottom 17. The walls are in the form of undulating structures with their main extension radially directed to the air outlet 11. The walls cause the inflowing air to move horizontally along a zig-zag path without appreciable vertical deflection. The number, position and shape of the walls 25 is adapted so that optimal separation of grease is obtained at the least resistance to flow. Certain or all of the walls or portions thereof can be arranged to form distance pieces, to maintain the upper portion 15 and the bottom 17 in spaced apart relationship.

In FIGS. 4 and 5, the air deflection members are shown in the form of vanes 29a which bridge over the distance between the upper portion and the filter unit bottom.

The particles of fat removed from the through flowing air are collected on the air deflecting members and on the bottom of the separator units. In the illustrated examples, the bottom 17 is provided with an upwardly folded outer edge 27 which projects slightly beyond the upper portion 15 to capture any particles of grease which may fall from the outer edge surface thereof. When the separator unit is to be cleaned, the catch members are removed, whereafter the upper portion and bottom are removed together. The interior of the separator unit can be easily cleaned, subsequent to swinging the bottom and the upper portion apart. The fan housing can also be easily cleaned, since its bottom is formed by the upper portion of the separator unit which has been removed.

I claim:

1. A kitchen ventilator comprising a ventilator hood having an air outlet, a fan housing in said hood and having a fan, said fan housing having a suction air inlet and an air outlet, said air outlet of said fan housing opening onto said air outlet of said hood, a grease capturing separator unit having a first planar wall having a peripheral edge and an opening therethrough to said suction air inlet of said fan housing, said grease capturing separator unit having a second planar wall extending substantially parallel to said first wall and spaced therefrom, said second wall having a peripheral edge that is bent slightly towards said first wall whereby grease collected by said separator unit will be retained by said second wall, at least a portion of the space between said peripheral edges of said first and second walls being open to define an air inlet to said separator unit, said second wall of said separator unit constituting the closed bottom of said ventilator hood, said separator unit also having air flow deflection members comprising a plurality of posts which are formed integrally with and extend from said first wall to said second wall to cause repeated deflections of air passing through said separator unit to said suction air inlet of said fan housing, means removably mounting said separator unit in said hood adjacent said fan.

2. A kitchen ventilator as claimed in claim 1, wherein said posts are shaped as air deflecting vanes.

* * * * *